(12) United States Patent
Scheel et al.

(10) Patent No.: US 8,324,879 B2
(45) Date of Patent: Dec. 4, 2012

(54) POWER INVERTER CONTROL DEVICE FOR SWITCHING POINT DETERMINATION

(75) Inventors: Thomas Scheel, Stolberg (DE); Christian Hattrup, Wurselen (DE); Peter Lurkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 399 days.

(21) Appl. No.: 12/298,095

(22) PCT Filed: Apr. 10, 2007

(86) PCT No.: PCT/IB2007/051270
§ 371 (c)(1), (2), (4) Date: Oct. 22, 2008

(87) PCT Pub. No.: WO2007/122530
PCT Pub. Date: Nov. 1, 2007

(65) Prior Publication Data
US 2009/0179671 A1 Jul. 16, 2009

(30) Foreign Application Priority Data
Apr. 25, 2006 (EP) .................. 06113073

(51) Int. Cl.
*G05F 1/00* (2006.01)
(52) U.S. Cl. .................................. 323/284
(58) Field of Classification Search .......... 323/284, 323/285; 327/74, 79; 363/35, 37, 51, 124
See application file for complete search history.

(56) References Cited

U.S. PATENT DOCUMENTS

| | | | |
|---|---|---|---|
| 5,073,849 A * | 12/1991 | Morris | 363/21.03 |
| 5,121,317 A | 6/1992 | Vogler | |
| 5,166,549 A | 11/1992 | DeDoncker | |
| 5,315,260 A * | 5/1994 | Link et al. | 327/184 |
| 5,777,866 A | 7/1998 | Jacobs et al. | |
| 5,790,396 A * | 8/1998 | Miyazaki et al. | 363/96 |
| 6,664,816 B1 * | 12/2003 | Nguyen et al. | 327/74 |
| 7,417,412 B2 * | 8/2008 | Koh | 323/285 |
| 7,652,900 B2 * | 1/2010 | Fukaya et al. | 363/132 |
| 2004/0119449 A1 | 6/2004 | Matley | |
| 2005/0281061 A1 | 12/2005 | Radecker et al. | |

FOREIGN PATENT DOCUMENTS

| | | |
|---|---|---|
| EP | 0474312 A1 | 3/1992 |
| EP | 1341144 B1 | 9/2003 |
| JP | 01069265 A | 3/1989 |
| WO | 2004105226 A1 | 12/2004 |

OTHER PUBLICATIONS

Zaohong Yang et al: "A novel technique to achieve unity power factor and high quality waveform in AC-to-DC converters" Industry Applications Conference, 1998 Thirty-Third IAS Annual Meeting. The 1998 IEEE vol. 2, Oct. 12, 1998, pp. 1275-1285, XP010313049 ISBN: 0-7803-4943-1.

Noon J P et al: "Practical design issues for PFC circuits" Applied Power Electronics Conference and Exposition, 1997. APEC, Proceedings 1997., Twelfth Annual Atlanta, GA, vol. 1, Feb. 23, 1997, pp. 51-58, XP010215800 ISBN: 0-7803-3704-2.

(Continued)

*Primary Examiner* — Adolf Berhane
*Assistant Examiner* — Yemane Mehari

(57) ABSTRACT

Current switching point determination devices use two comparators with fixed threshold values. A power inverter control device for switching point determination is provided which includes a filter circuit and a subsequent single comparator. By this arrangement, the time event is independent of the amplitude and for sufficiently small frequencies also of the frequency.

13 Claims, 3 Drawing Sheets

OTHER PUBLICATIONS

Simone Buso et al: "Simplified Control Technique for High-Power-Factor Flyback Cuk and Sepic Rectifiers Operating in CCM" IEEE Transactions on Industry Applications, vol. 36, No. 5, Sep./Oct. 2000, pp. 1413-1418 XP011022825 ISSN: 0093-9994.

Nishida Y et al: "A single-phase buck-boost AC-to-DC converter with high-quality input and output waveforms" Industrial Electronics, 1995. ISIE Proceedings of the IEEE International Symposium on Athens, vol. 1, Jul. 10, 1995, pp. 433-438, XP010161379 ISBN: 0-7803-2683-0.

Dallago E et al: "Resonant driving control for low power supplies with piezoelectric transformer" Electronics Letters, IEEE Stevenage, GB, vol. 38, No. 22, Oct. 24, 2002, pp. 1400-1401, XP006019106 ISSN: 0013-5194.

Yuri Panov et al: "Adaptive Off-Time Control for Variable-Frequency, Soft-Switched Flyback Converter at Light Loads" IEEE Transactions on Power Electronics, vol. 17, No. 4, Jul. 2002, XP011078192 ISSN: 0885-8993.

Mark S. Hooper, Submicron CMOS Programmable Analog Floating-Gate Circuits and Arrays using DC-DC Converters, Georgia Institute of Technology, Apr. 2005.

Francisco Venustiano, Novel DC/DC Converter for High-Power Distributed Power Systems, 2003, pp. 5-14 & 81-87.

Praneet Athalye, et al: Averaged Switch Modeling of Active-Clamped Converters, IECON'01: The 27th Annual Conference of the IEEE Industrial Electronics Society, 2001 IEEE, pp. 1078-1083.

* cited by examiner

POWER INVERTER CONTROL DEVICE FOR SWITCHING POINT DETERMINATION

The invention relates to the field of power conversion. In particular, the invention relates to a power inverter control device for switching point determination and a method of determining a switching point.

For the operation of a Metal Oxide Semiconductor Field Effect Transistor (MOSFET) inverter at high frequencies it is important to activate the devices a certain time $T_d$ before the zero crossing of the switching current. The classical way to determine this time event is to use two comparators with fixed threshold values, and use the comparator that toggles first for the switching point determination, as depicted in FIG. 1. For example, for the zero crossing from negative to positive current this would be the comparator with the negative threshold $I_{Th2}$. For the zero crossing from positive to negative current this would be the comparator with the positive threshold $I_{Th1}$.

A drawback of the classical realization as depicted in FIG. 1 may be, that the time $T_d$ depends on the amplitude as well as on the frequency of the current, which may not be acceptable for high frequency MOSFET inverters. Furthermore, at least two comparators are required.

It would be desirable to have an improved switching point determination of a MOSFET device.

The invention provides a power inverter control device and a method with the features according to the independent claims.

According to an exemplary embodiment of the present invention, a power inverter control device for switching point determination of a metal oxide semiconductor field effect transistor may be provided, the power inverter control device comprising a filter unit adapted for filtering an incoming current signal on the basis of a transfer function, resulting in a filtered signal, and a comparator unit adapted for comparing the filtered signal with a threshold value, wherein the switching point determination is performed on the basis of the comparison of the filtered signal with the threshold value.

Therefore, the power inverter control device may be adapted for performing a switching point determination which is not dependent on the amplitude of the incoming signal and which, for sufficiently small frequencies, is also independent of the frequency of the incoming signal.

The realization of the power inverter control device according to the invention may be very simple. Only one comparator is needed and the filter may be realized with one operational amplifier.

According to another exemplary embodiment of the present invention, the filter unit comprises an operational amplifier.

Thus, according to this exemplary embodiment of the present invention, the power inverter control device may be implemented in hardware.

According to another exemplary embodiment of the present invention, the metal oxide semiconductor field effect transistor is used for an inverter or a resonant converter.

This may provide for a fast power conversion for high frequency applications.

According to another exemplary embodiment of the present invention, the transfer function of the filter unit corresponds to $1+sT_d$.

Therefore, according to this exemplary embodiment of the present invention, the switching point determination is easily provided by using a standard filter circuit and a subsequent comparator, wherein the switching time $T_d$ is independent of the frequency of the incoming signal.

According to another exemplary embodiment of the present invention, the transfer function of the filter unit corresponds to $$\frac{1+s(T_d+T_v)}{1+sT_v},$$

resulting in an attenuation of high frequency components. This may minimize disturbances for high frequencies.

According to another exemplary embodiment of the present invention, the filter unit is adapted in hardware, wherein the transfer function of the filter unit corresponds to $$\frac{1+s(R+R_v)C}{1+sR_v},$$

resulting in an attenuation of high frequency components. R is a first resistor, $R_v$ is a second resistor, and C is a capacitor, wherein the first resistor is arranged between an inverting input and an output of the operational amplifier, and wherein the second resistor and the capacitor are connected in series and are arranged between the inverting input and ground.

Therefore, the filter circuit may realize a constant filter time $T_d$=RC. This time $T_d$ is independent of the frequency and of the amplitude if the frequency is sufficiently small.

According to another exemplary embodiment of the present invention, the threshold value is a predetermined fixed threshold value 0.

According to another exemplary embodiment of the present invention, a method of determining a switching point of a metal oxide semiconductor field effect transistor may be provided, the method comprising the steps of filtering an incoming current signal on the basis of a transfer function, resulting in a filtered signal, and comparing the filtered signal with a threshold value. Furthermore the method comprises the step of determining a switching point on the basis of the comparison of the filtered signal with the threshold value.

Furthermore, the method may comprise the step of activating the metal oxide semiconductor field effect transistor at the switching point.

It may be seen as the gist of an exemplary embodiment of the present invention, that the switching point of MOSFET inverter/resonant converter is performed at high frequencies on the basis of a filter circuit and a subsequent single comparator without additional comparators. By this arrangement, the time event is independent of the amplitude and, in a certain frequency range, independent of the frequency.

These and other aspects of the present invention will become apparent from and elucidated with reference to the embodiments described hereinafter.

Exemplary embodiments of the present invention will be described in the following, with reference to the following drawings.

The illustration in the drawings is schematically. In different drawings, similar or identical elements are provided with the same reference numerals.

Figure 1:
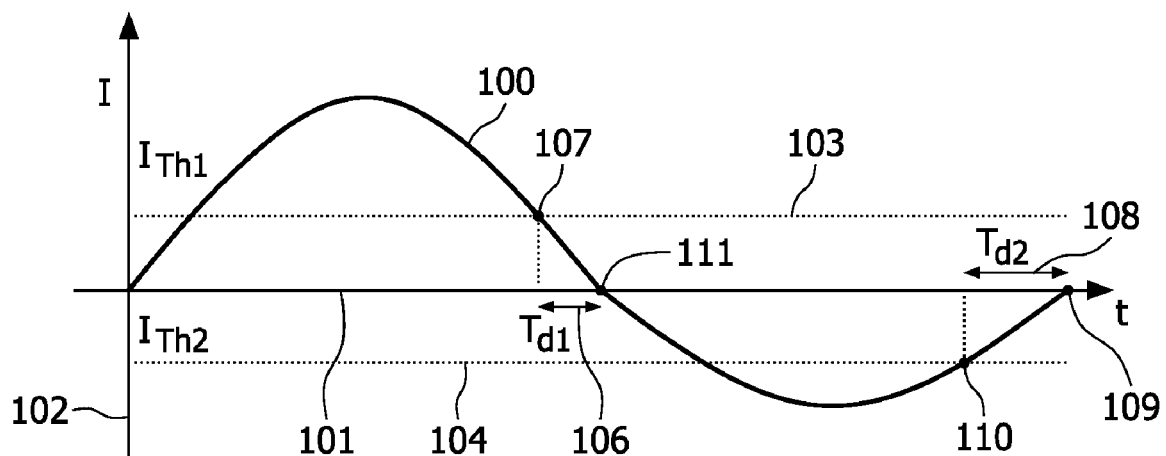
FIG. 1 shows a schematic representation of a switching point determination with two comparators.

FIG. 1 shows a schematic representation of a switching point determination with two comparators with threshold values $I_{Th1}$ and $I_{Th2}$. The horizontal axis 101 represents the time t and the vertical axis 102 represents the current I. The incoming current signal is represented by signal 100. The first comparator used for switching point determination has a fixed threshold value $I_{Th1}$ and the second comparator has a fixed (lower) threshold value $I_{Th2}$, as represented by reference numerals 103, 104, respectively.

When the current signal 100 is approaching the zero crossing 109 from negative to positive current, the second comparator will toggle at switching point 110, since the current signal 100 passes the lower threshold value 104.

This results in a switching point 110, which lies a time $T_{d2}$ 108 before the zero crossing 101.

On the other hand, if the zero crossing 111 is approached from the positive side, the switching point 107 is determined by the first comparator having a positive threshold value 103. The switching is then performed at a time $T_{d1}$ 106 before the zero crossing 111.

Here, the time $T_d$ depends both on the amplitude as well as on the frequency of the current.

Figure 2:
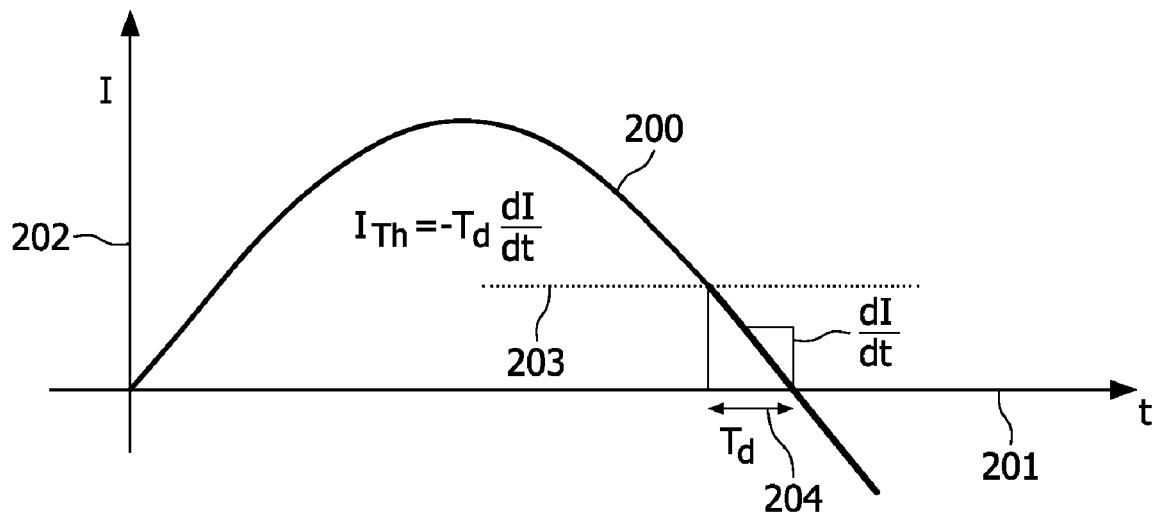
FIG. 2 shows a schematic representation of a determination of threshold values by differentiation.

FIG. 2 shows a schematic representation of a threshold value determination by differentiation. Horizontal axis 201 represents the time t and vertical axis 202 represents the current I. The incoming current signal is represented by the signal 200.

Under the assumption of a nearly sinusoidal current and a time $T_d \ll T$, wherein T is the time period of the current, one can determine exactly the required threshold value $I_{Th}$ for the current by a differentiation, as depicted in FIG. 2.

The threshold value $I_{Th}$ 203 depends on the derivative $$\frac{dI}{dt}$$

and the switching time $T_d$ 204. The required switching event for a transition from positive to negative current is now given by the time where $$I < I_{Th} \text{ with } I_{Th} = -T_d \frac{dI}{dt} \quad \text{(equation 1)}$$

becomes the first time true. Rearrangement of this formula yields $$I + T_d \frac{dI}{dt} < 0 \quad \text{(equation 2)}$$

It should be noted, that for a transition from negative to positive current the "<" sign has to be replaced by the ">" sign in equations 1+2.

Figure 3:
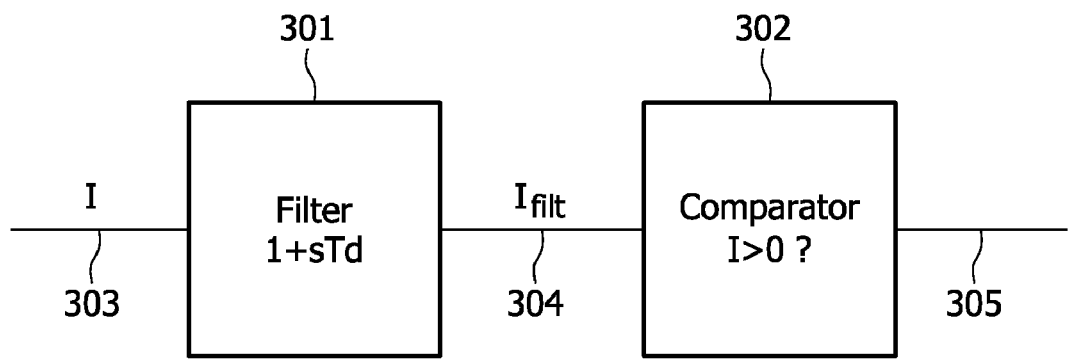
FIG. 3 shows a schematic representation of a power inverter control device according to an exemplary embodiment of the present invention.

FIG. 3 shows a schematic representation of a switching point determination with a filter 301, used for realizing the comparator equation (equation 2).

As may be seen from FIG. 3, the device comprises a filter 301 with a transfer function $1+sT_d$ and a subsequent comparator 302 with fixed threshold value 0.

The incoming current signal 303 is filtered on the basis of the transfer function. The resulting filtered signal 304 is then compared with a threshold value by comparator 302. The comparator 302 then outputs signal 305. The switching points are then given by the events where this output signal changes from zero to one or vice versa.

In order to minimize disturbances for high frequencies it may be advantageous to limit the transfer function for high frequencies. This may yield to a transfer function of the filter according to $$G = \frac{1 + s(T_d + T_v)}{1 + sT_v} \quad \text{(equation 3)}$$

Figure 4:
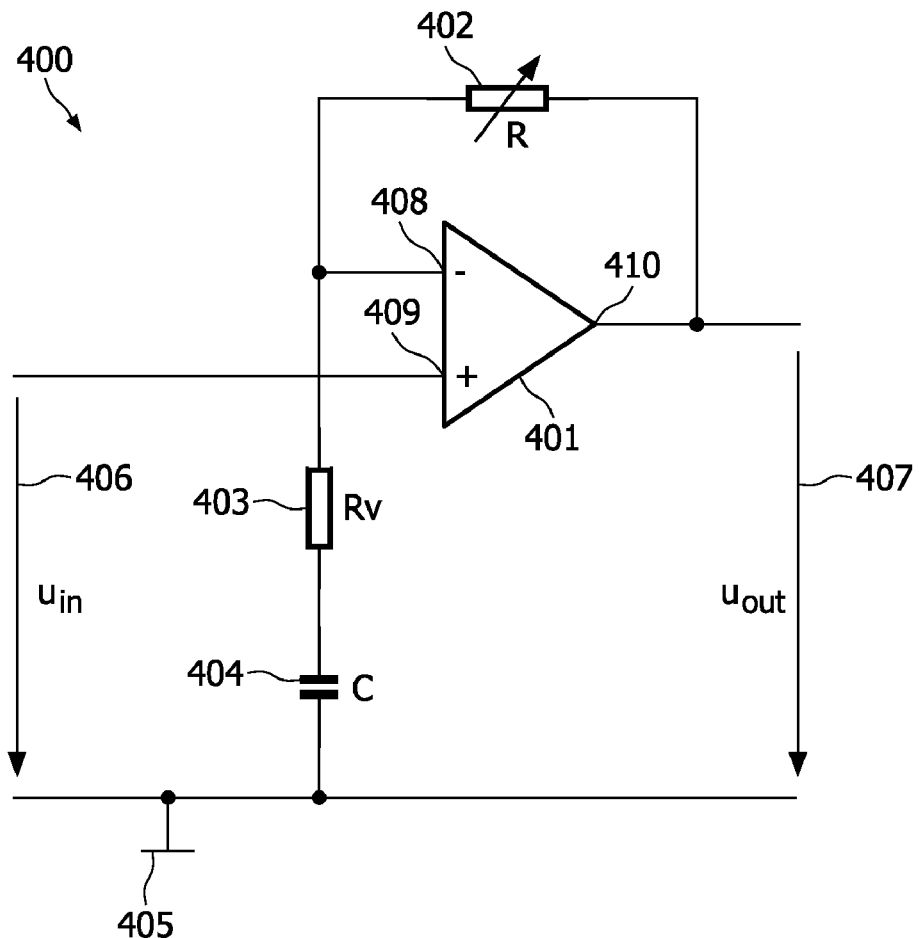
FIG. 4 shows a schematic representation of a filter realized by hardware with one operational amplifier.

Such a filter may be realized by hardware with one operational amplifier, as depicted in FIG. 4.

FIG. 4 shows a schematic representation of a filter unit 400 adapted by hardware and comprising one operational amplifier 401. The incoming signal 406 is delivered to the non-inverting input 409 of the operational amplifier 401. 405 represents the ground potential.

The inverting input 408 of the operational amplifier 401 is connected to the ground potential 405 via the second resistor $R_v$ 403 and capacitor 404. Furthermore, the inverting input 408 is connected to the output 410 of the operational amplifier 401 via an adjustable resistor 402.

The filtered output signal 407 may subsequently be fed to a corresponding comparator unit 302 (as depicted in FIG. 3).

The transfer function of this electronic circuit is given by $$G = \frac{1 + s(R + R_v)C}{1 + sR_v} \quad \text{(equation 4)}$$

which has the same structure as equation 3. For frequencies $\omega \ll 1/((R+R_v)C)$ the phase shift of this electronic circuit is given by $$\phi \approx \omega(R+R_v)C - \omega R_v C = \omega RC \quad \text{(equation 5)}$$

This may be converted to a filter time $T_d = \phi/\omega$ $$T_d = RC \quad \text{(equation 6)}$$

That means that the circuit depicted in FIG. 4 may realize a constant filter time $T_d = RC$. This time $T_d$ is independent of the frequency ($\omega < 1/((R+R_v)C)$) and of the amplitude if the frequency is sufficiently small.

Figure 5:
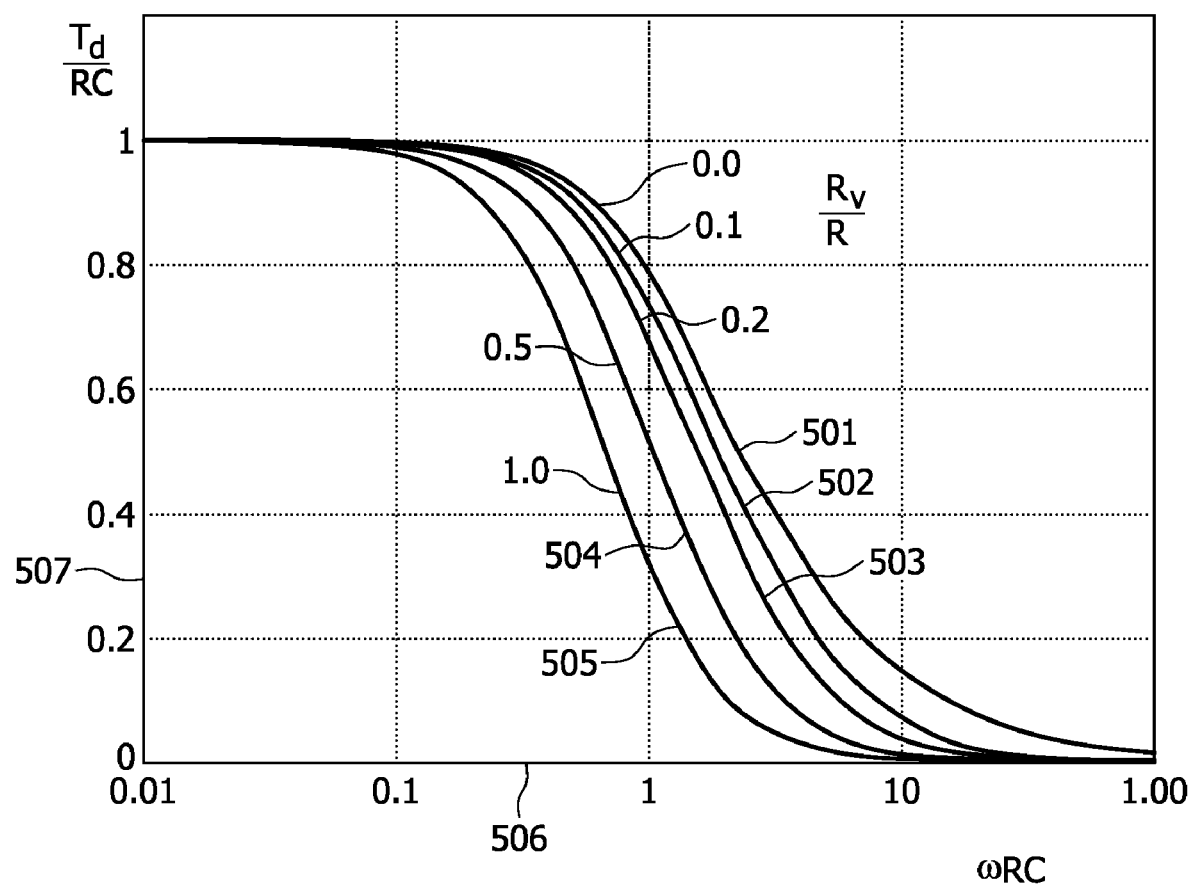
FIG. 5 shows a schematic representation of the normalized time $T_d$ as a function of normalized frequency for different values $$\frac{R_v}{R}.$$

FIG. 5 shows a schematic representation of the normalized time $T_d$ as a function of normalized frequency for different values $R_v/R$. Horizontal axis 506 shows $\omega RC$, logarithmically ranging from 0.01 to 100, and vertical axis 507 shows $T_d/(RC)$, linearly ranging from 0 to 1.2.

As may be seen from FIG. 5, if the frequency is in the range of $1/((R+R_v)C)$ the time $T_d$ is reduced and dependent of the frequency. However, in any case the time $T_d$ is independent of the amplitude.

Curves 501, 502, 503, 504 and 505 depict the dependency of the delay time on the frequency for different ratios of $R_v/R$.

Curve 501 corresponds to a ratio $R_v/R$ of 0, curve 502 corresponds to a ratio of 0.1, curve 503 corresponds to a ratio of 0.2, curve 504 corresponds to a ratio of 0.5 and curve 505 corresponds to a ratio of 1.0.

The present invention may be applied to many power electronic systems.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A power inverter control device which determines a switching point for a MOSFET power transistor, the power inverter control device comprising:
   a filter unit which receives an input sinusoidal signal and determines a rate of change of the sinusoidal signal versus time applying a transfer function; and
   a single comparator which controls the MOSFET power transistor to switch at switching points in response to the rate of change of the input sinusoidal signal matching a selected rate of change, such that the switching points on the input sinusoidal signal at which the comparator causes the MOSFET power transistor to switch are independent of an amplitude of the input sinusoidal signal;
   wherein the transfer function is defined by one of:

$$1 + sT_d \text{ or } \frac{1 + s(T_d + T_v)}{1 + sT_v}$$

where $T_v$ is a period of the sinusoidal signal and $T_d$ is a time between the switching points and a zero crossing of the sinusoidal signal.

2. The power inverter control device of claim 1, wherein the filter unit comprises an operational amplifier.

3. The power inverter control device of claim 1, wherein the filter unit is configured in hardware.

4. The power inverter control device of claim 1, wherein the power transistor is used in a resonant converter.

5. The power inverter control device of claim 1 wherein the filter unit includes:
   an operational amplifier having a first input which receives the incoming sinusoidal signal, a second input, and an output;
   a first resistor, R, disposed between the output and the second input of the operational amplifier in a feedback loop;
   a second resistor, $R_v$, and a capacitor, C, disposed between the second input and a reference potential.

6. The power inverter control device of claim 5, wherein the second resistor R is adjusted to select the selected rate of change.

7. A power inverter control device comprising:
   a filter unit which filters an incoming alternating current signal with a transfer function to generate a filtered signal including:
   an operational amplifier which receives the alternating current signal at a non-inverting input;
   a first resistor, R, disposed between an inverting input and an output of the operational amplifier in a feedback loop;
   a second resistor, $R_v$, and a capacitor, C, disposed between the inverting input and the ground potential; and
   wherein the transfer function of filter unit is defined as one of:
   $1 + sT_d$ wherein $T_d = RC$, a fixed time between the switching point and a zero-crossing of the incoming alternating current signal; and $$\frac{1 + s(T_d + T_v)}{1 + sT_v},$$

where $T_v$ is a cycle duration of the alternating current signal, and $T_d = RC$; and
   a comparator unit which compares the filtered signal with a threshold value and outputs a signal which determines a switching point for the power transistor.

8. A power inverter control device comprising:
   a filter unit which filters an incoming alternating current signal based on a transfer function, resulting in a filtered signal, the filter unit including:
   an operational amplifier which receives the incoming alternating current signal at a non-inverting input;
   a first resistor, R, disposed between an inverting input and an output of the operational amplifier in the feedback loop;
   a second resistor, $R_v$, and a capacitor, C, disposed between the inverting input and the ground potential; and
   wherein the transfer function of the filter unit is defined as:

$$\frac{1 + s(R + R_v)C}{1 + sR_v}; \text{ and}$$

a comparator unit which compares the filtered signal with a threshold value and switching of the power transistor between ON and OFF.

9. The power inverter control device of claim 8, wherein the threshold value is a predetermined fixed threshold value 0.

10. The power inverter control device of claim 8, wherein the threshold value is based on a rate of change of the incoming alternating signal.

11. The power inverter control device of claim 8, wherein the threshold value is based on a slope of the incoming alternating signal.

12. A method of determining a switching point of a power inverter, the method comprising the steps of
   filtering, by a filter unit, an incoming sinusoidal current signal based on a transfer function, wherein the transfer function is defined by one of:

$$1 + sT_d \text{ or } \left( \frac{1 + s(T_d + T_v)}{1 + sT_v} \right)$$

where $T_v$ is a period of the sinusoidal signal and $T_d$ is a time between the switching points and a zero crossing of the sinusoidal signal;

comparing, with a comparator unit, the filtered signal with a threshold value; and outputting a signal to the power inverter which controls a switching point of the power inverter based on the comparison of the filtered signal with the threshold value.

13. A power inverter control device which determines a switching point for a MOSFET power transistor, the power inverter control device comprising:

a filter unit which receives an input sinusoidal signal and determines a rate of change of the sinusoidal signal versus time applying a transfer function and includes:

an operational amplifier having a first input which receives the incoming sinusoidal signal, a second input, and an output;

a first resistor, R, disposed between the output and the second input of the operational amplifier in a feedback loop;

a second resistor, $R_v$, and a capacitor, C, disposed between the second input and a reference potential; and wherein the transfer function of the filter unit is:

$$\frac{1 + s(R + R_v)C}{1 + sR_v}$$ and;

a single comparator which controls the MOSFET power transistor to switch at switching points in response to the rate of change of the input sinusoidal signal matching a selected rate of change, such that the switching points on the input sinusoidal signal at which the comparator causes the MOSFET power transistor to switch are independent of an amplitude of the input sinusoidal signal.

* * * * *